H. D. PERKY, DEC'D.
L. SPARKS, ADMINISTRATOR.
FOOD FROM GRAIN AND METHOD OF MAKING THE SAME.
APPLICATION FILED JAN. 19, 1906.

1,026,047.   Patented May 14, 1912.

Witnesses
Stuart Hilder
George M. Anderson

Henry D. Perky, dec'd,
Inventor
Laban Sparks, Administrator
by E. W. Anderson
his Attorney

UNITED STATES PATENT OFFICE.

HENRY D. PERKY, OF GLENCOE, MARYLAND; LABAN SPARKS, ADMINISTRATOR OF SAID HENRY D. PERKY, DECEASED, ASSIGNOR, BY MESNE ASSIGNMENTS, TO THE SHREDDED WHEAT COMPANY, OF NIAGARA FALLS, NEW YORK.

FOOD FROM GRAIN AND METHOD OF MAKING THE SAME.

1,026,047.     Specification of Letters Patent.     Patented May 14, 1912.

Application filed January 19, 1906. Serial No. 296,880½.

*To all whom it may concern:*

Be it known that I, HENRY D. PERKY, a citizen of the United States, and resident of Glencoe, in the county of Baltimore and State of Maryland, have made a certain new and useful Invention in a Form of Food from Grain and Method of Manufacturing the Same; and I declare the following to be a full, clear, and exact description of the same, such as will enable others skilled in the art to which it appertains to make and use the invention.

Figure 1:
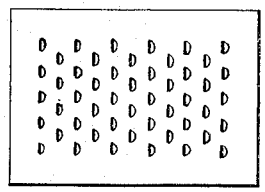
Figure 2:
Figure 4:
Figure 3:
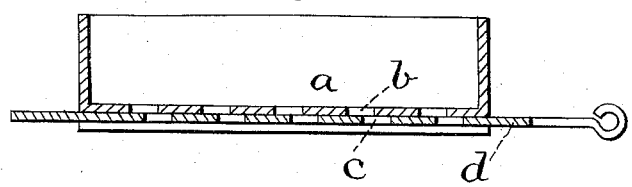

Figure 1 of the drawings shows a perforated plate adapted to be used in producing the threads. Fig. 2 shows threads of the character produced by passing the material through the perforations of this plate. Fig. 3 shows a fixed perforated plate under the movable perforated plate holding the solid material. Fig. 4 represents an enlarged view of a filament made up of cross sections of the material.

The object of the invention is the preparation of grain, particularly of Indian corn or maize in a novel, palatable and attractive form for food; and the invention consists in a new process of manufacture, and the product thereof, as herein set forth.

In carrying out this invention, the grains are designed to be deprived of their outer coats or hulls by means of any ordinary process. The grain is then ground, and, mixed with a suitable amount of water, is cooked in an air-tight or nearly air-tight and water-tight vessel, by immersing the same in boiling water for about seven hours for corn, or until the cooking is completed, the time depending upon the kind of grain employed. In this process the amount of water is designed to be limited to that which will be taken up by the material in cooking. The cooked material is then cooled to solid or hardened form, in which condition it is designed to be pressed through a perforated plate in such a manner as to produce elongated, ribbon-like forms, having a transversely convex surface and edges of crenated character.

In Fig. 3 of the drawing, the letter $a$, designates a fixed plate having perforations $b$; and $c$, a movable plate having perforations $d$, similar to the perforations $b$, and in line therewith. The material being pressed against the plate $a$, fills the perforations $b$, and, as the plate $c$, is moved against plate $a$, the material in the perforations of the latter plate is pushed into the perforations $d$. Sections are thus made, plate $a$, serving as a feeding and cut-off plate. In passing through the perforations the material is pressed so as to adhere and form a filament of sectional structure. The plates $a$, and $c$, may be so arranged that the moving plate $c$, shall be next the material.

The perforations of the plate employed the designed to have thin edges and are preferably of small size. Apertures about one-sixteenth of an inch wide give good results for corn. The perforations are designed to have semicircular or concave cutting edges which project slightly from the general surface of the plate, so that they will take hold of the material when it is pressed against them with a movement of the material along the plate, or reverse. The perforations are preferably circular but may be of crescent or of plano-convex shape, and as the material passes through them, it is cut from the solid mass in the form of a thin, elongated filament or ribbon, having transverse convex surface and notched or crenated edges. In passing through the perforations, the material is loosened up from its set position in the mass, and being abruptly diverted by the cutting action is given a semi-jointed character, on account of the re-arrangement of the particles of material in the filament. These filaments are designed to have sufficient firmness to hold their form in convenient lengths while being dried, and the drying is facilitated by their longitudinal curvature, which, when they are piled, allows the hot air of the dryer ready access to all of their parts. The material having been set or hardened in the process, the filaments have sufficient firmness to prevent them from becoming agglomerated when piled on the drying pans. And when they are dried in falling through a hot air flue, they are finished in separate or nearly separate form, and are very delicate, crisp and short in their texture. By this process, therefore, it is designed to provide these filaments or ribbons of cereal food in sufficient quantity to supply an agreeable and healthful breakfast food in an economical manner.

When the perforated plate is moved transversely as well as pressed against the material, the ribbons are designed to have a sort of crinkled character, which is made more definite when a perforated cut-off plate is employed adjacent to the filament forming plate, such cut-off plate being stationary or having a different rate of motion from the reducing plate. By this means the material is reduced by cutting small cross sections of the material, and as these cross sections are successively formed, they adhere to each other by their cut surfaces and these sectional accretions form the filaments.

Having described the invention, what I claim and desire to secure by Letters Patent is—

1. The process of cooking ground corn with a limited amount of water, cooling the cooked mass until it is set in solid condition, cutting from the solid material successive small cross sections, and causing them to adhere together by their cut surfaces to provide fine filaments of semi-jointed or crinkled character, and drying the same in separate condition.

2. An article of food of cooked ground corn, consisting of separate thin dried filaments, each composed of small cross sectional accretions adherent to each other by their cut surfaces, whereby it is given a jointed structure.

In testimony whereof I affix my signature, in presence of two witnesses.

HENRY D. PERKY.

Witnesses:
  WM. C. BREED,
  L. S. BURBANK.